United States Patent [19]
Harrison

[11] Patent Number: 5,528,265
[45] Date of Patent: Jun. 18, 1996

[54] ORIENTATION-OPERATED CURSOR CONTROL DEVICE

[76] Inventor: Simon J. Harrison, 311 Hermosa St., South Pasedena, Calif. 91030

[21] Appl. No.: 276,816

[22] Filed: Jul. 18, 1994

[51] Int. Cl.⁶ .................................................... G09G 5/08
[52] U.S. Cl. .................................. 345/158; 345/163
[58] Field of Search .................................. 345/157, 163, 345/164, 165, 167, 161, 158

[56] References Cited

U.S. PATENT DOCUMENTS

| | | | |
|---|---|---|---|
| 3,541,541 | 11/1970 | Engelbart | 340/324 |
| 4,464,652 | 8/1994 | Lapson et al. | 345/163 |
| 4,562,347 | 12/1985 | Hovey et al. | 250/221 |
| 4,580,006 | 4/1986 | Hull | 178/18 |
| 4,628,755 | 12/1986 | Hawley | 74/471 |
| 4,748,441 | 5/1988 | Brzezinski | 340/709 |
| 4,769,517 | 9/1988 | Swinney | 200/6 |
| 4,787,051 | 11/1988 | Olson | 364/518 |
| 4,839,838 | 6/1989 | LaBiche et al. | 364/709.11 |
| 5,059,958 | 10/1991 | Jacobs et al. | 340/706 |
| 5,128,671 | 7/1992 | Thomas, Jr. | 341/20 |
| 5,142,655 | 8/1992 | Drumm | 379/52 |
| 5,168,221 | 12/1992 | Houston | 324/207.13 |
| 5,181,181 | 1/1993 | Glynn | 364/566 |
| 5,291,213 | 3/1994 | Krauss | 345/164 |

OTHER PUBLICATIONS

"Speed Keyboard for data Processor" by Keeley IBM Technical Disclosure Bulletin vol. 23, No. 2, Jul. 1990.
"Rather Rock Than Roll" Palm Point by Zirco, Byte Mar. 1992 p. 211.
*The Winn Rosch Hardware Bible*, Winn L Rosch, 1989, pp. 256–264.
Patent Talk, Russ Reiss, *The Computer Applications Journal*, Issue #42, Jan. 1994, pp. 76–80.

*Primary Examiner*—Tommy P. Chin
*Assistant Examiner*—Gin Goon
*Attorney, Agent, or Firm*—Christie, Parker & Hale

[57] ABSTRACT

An orientation-operated cursor control device having a housing which is hand-holdable by a user. The housing rotatably carries a orientation maintaining member having a center of rotation which is offset from a center of gravity. An encoder generates input information for the computer in response to relative rotation of the housing and orientation maintaining member.

18 Claims, 13 Drawing Sheets

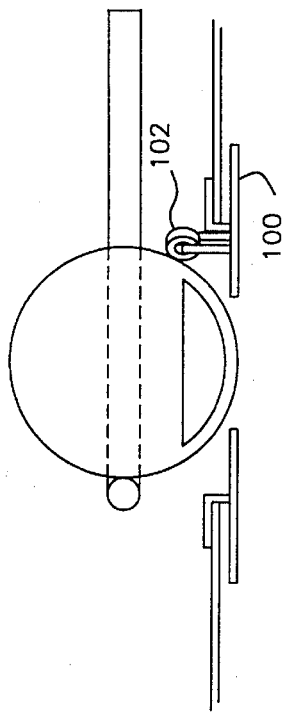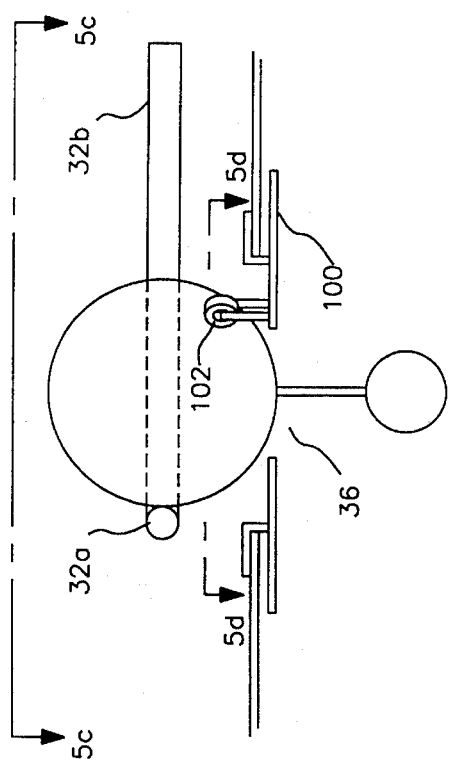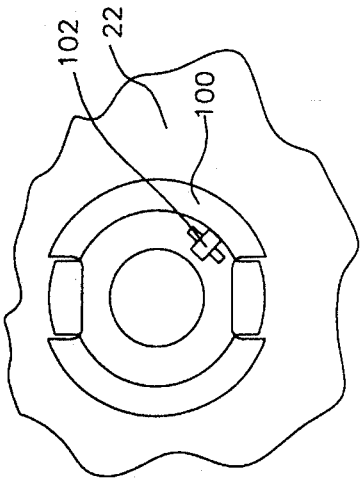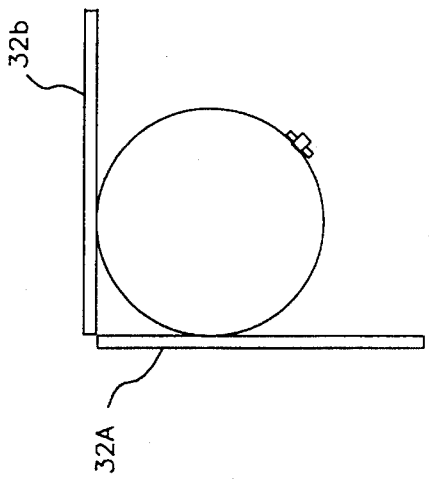

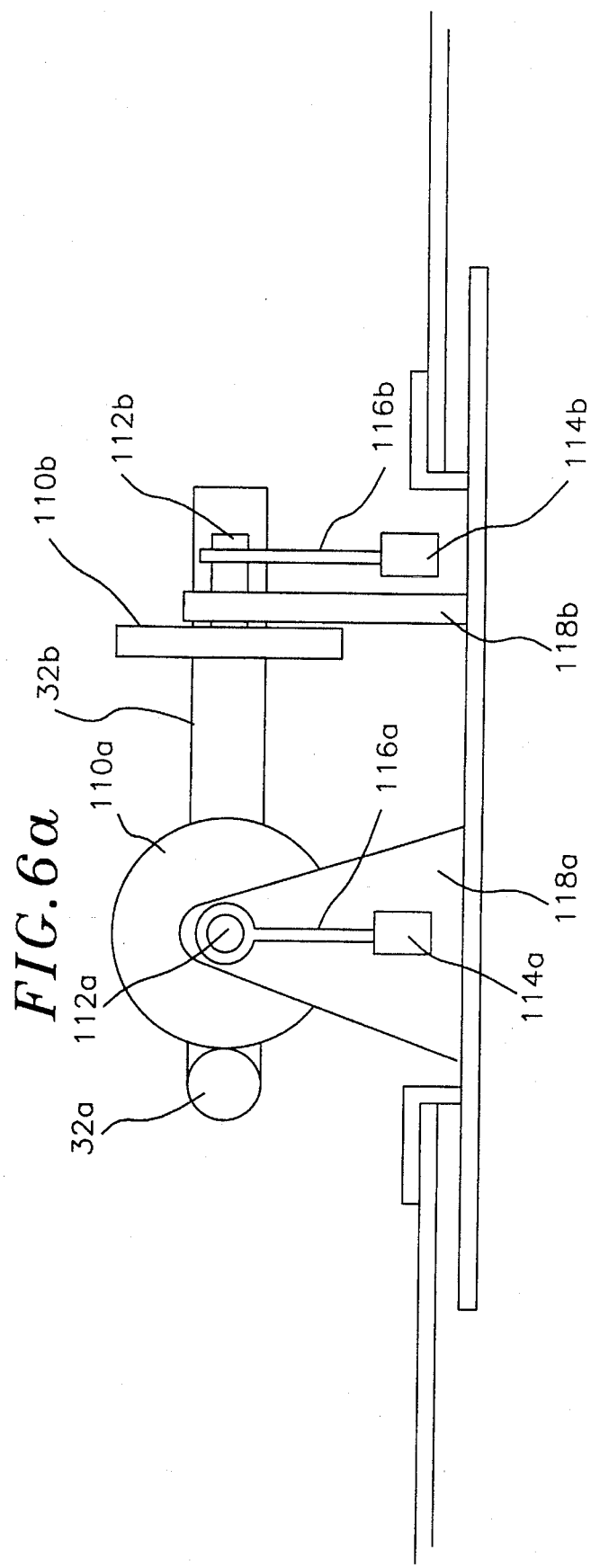

ORIENTATION-OPERATED CURSOR CONTROL DEVICE

BACKGROUND OF THE INVENTION

The invention pertains to computer input devices used for cursor or pointer control on a video display. More particularly, the invention pertains to a cursor control device which provides input based upon on its orientation as distinguished from its position.

There are a variety of computer cursor control devices presently on the market. Although the position of a cursor on a computer display may be controlled by use of keys on a keyboard (such as the standard four directional arrow keys), an accessory device is often used instead.

The most common such device is a "mouse." The mouse is typically moved over a planar surface such as a table top to provide two dimensional cursor control information to the computer responsive to movement within the plane. The most common type of mouse is the ball-type mouse. One such mouse is disclosed in U.S. Pat. No. 4,464,652 by William F. Lapson and William D. Atkinson, the disclosure of which is incorporated herein by reference. In such a mouse, a uniform spherical ball is suspended within a housing and is exposed at the base of the housing so as to contact any planar surface upon which the mouse is placed. As the user grips the housing and moves the mouse over the surface, the ball rolls. As the ball rolls, its orientation relative to the housing changes. A pair of orthogonal encoders detect the change in relative orientation and provide a corresponding input to the computer.

In a typical mouse, the switches and encoders or transducers provide raw signal information to circuitry within the mouse. The signals are processed and combined by circuitry in the mouse into a form suitable for communication as output signals from the mouse to the computer. Thereafter the signals are processed by software in the computer, typically designated as a mouse driver, and then used to provide input to another software program. Exemplary signal, hardware and software protocols are disclosed in THE WINN ROSCH HARDWARE BIBLE, Simon & Schuster, Inc. 1989, ISBN 0-13-160979-3 (See pp. 256–264); GUIDE TO THE MACINTOSH FAMILY HARDWARE, Addison-Wesley Publishing Company, Inc. 1990, ISBN 0-201-52405-8; and LOGITECH MOUSE USER'S MANUAL, Logitech, Inc. 1988, the disclosures of which are incorporated herein by reference. In a two-button protocol used by Microsoft Corporation and a three-button protocol used by MSC Technologies, Inc., information is communicated from the mouse to the computer in respective three and five-byte groups wherein, respectively, two and three bits of the first byte in the group correspond to the state of each button (more particularly to the state of the switch associated with each button).

In many such mice, the ball is held within the housing by an annular retainer clip (or lock cap) which is secured to the base of the housing by a bayonet or similar type fitting. The ball projects through the central opening in the retainer clip for engaging the surface upon which the mouse is placed. To remove the ball, such as for cleaning, the clip is rotated so as to disengage its fitting and is then extracted, permitting the ball to be removed from the housing.

SUMMARY OF THE INVENTION

There is accordingly provided an orientation-operated computer cursor control device having a housing, hand-holdable by a user, rotatably carrying an orientation maintaining member, which member has a center of rotation offset from a center of gravity. Accordingly, the orientation maintaining member will tend to maintain its absolute orientation (relative to a gravitational frame of reference) when the housing is rotated into varying orientations. The resulting relative rotation of the housing and orientation maintaining member is detected by at least one encoder which generates input information for the computer in response to said relative rotation.

Preferred embodiments of the invention involve modifications to a standard ball-type computer mouse. In one set of embodiments, the orientation maintaining member is rotatably carried by a fixture portion secured to the existing mouse housing below the ball compartment. The orientation maintaining member has a spherical surface portion which is engageable with the surface of the mouse ball so that when the housing rotates relative to the orientation maintaining member, the ball rotates relative to the housing. In another set of embodiments, the conventional mouse ball is replaced by the orientation maintaining member which itself has a substantially spherical surface for engaging the existing encoder shafts of the mouse.

As these preferred embodiments retain much of the hardware of the existing mouse, additional cost is minimized. The ability to quickly retrofit from the original mouse facilitates selective use of the device in either a conventional mouse mode or in the orientation-operated mode. There is accordingly no need to provide additional ports in the computer to which redundant input devices may be connected and without which a user would have to disconnect one device to connect the other.

When used as an orientation-operated device, the retrofitted mouse may be used for cursor control in place of the standard conventional mouse. Additionally, it may substantially be used as a joystick in operations where the input is used not merely to position an on-screen cursor for entry of text but rather to change a frame of reference with which a scene is viewed. In such a role, the input device has advantages over a standard joystick in that it may be moved freely in space without the fixed base which is required by a conventional joystick.

BRIEF DESCRIPTION OF THE DRAWINGS

FIG. 3c is a partial semi-schematic bottom cutaway view of a fixture portion of the device of FIG. 3a;

FIG. 4b is a partial semi-schematic view of a gimbal mechanism of the control device of FIG. 4a;

FIGS. 5a & 5b are partial semi-schematic side cutaway views of control devices according to principles of the present invention;

FIG. 5c is a semi-schematic top view of a ball and encoder shafts of the control devices of FIGS. 5a and 5b;

FIG. 5d is a semi-schematic bottom view of a retainer clip portion of the control device of FIG. 5a;

FIG. 6a is a partial semi-schematic side cutaway view of a control device according to principles of the present invention;

FIG. 10b is a partial cross-sectional view of the device of FIG. 10a.

DETAILED DESCRIPTION

Figure 1A:
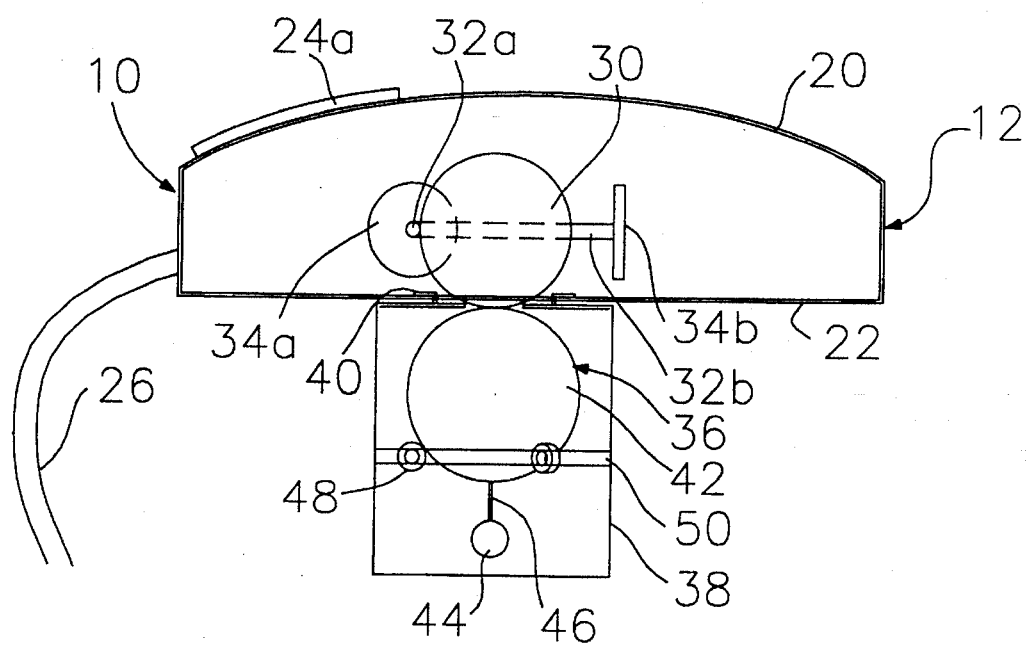
FIGS. 1a & 1b are semi-schematic side cutaway view of a control device according to principles of the present invention shown in a first and a second orientation.
Figure 8:
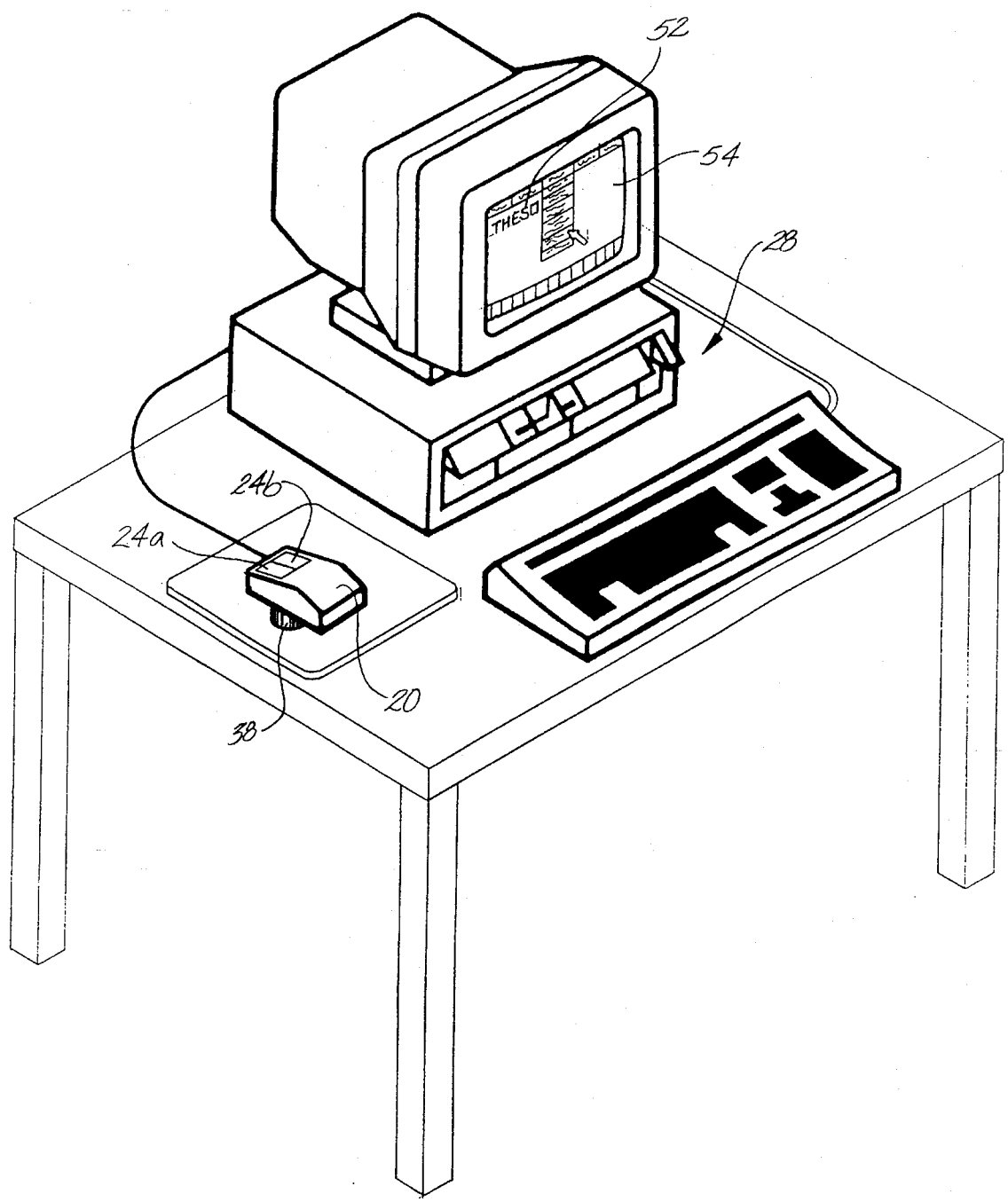
FIG. 8 is an illustration of a computer featuring a control device according to principles of the present invention.

As shown in FIG. 1a, an orientation-operated cursor control device has a forward end 10 and a rear end 12. The devise includes a housing which is hand holdable by a user and has an upper portion 20 and a base portion 22. The device has a switch with left and right buttons 24a and 24b (FIG. 8) extending through the upper housing portion adjacent the forward edge thereof. Wiring 26 extends from the device to a remote computer 28 (FIG. 8).

A uniform spherical ball 30 is suspended within and rotatably carried by the housing and engages a pair of first and second encoders having orthogonal shafts 32a and 32b, respectively, in contact with the surface of the ball the encoders have encoder disks 34a and 34b which rotate with the shafts. The encoders generate information responsive to relative rotation of the ball to the housing and are coupled to the computer by the wiring 26 for delivering this information as input information to the computer. As heretofore described, the device essentially comprises a conventional computer mouse.

An orientation maintaining member 36 is housed in and carried by a fixture 38 which is secured to the base portion 22 of the housing directly below the ball 30. The fixture is securable to and removable from the base by means of a fitting 40 which replaces the retainer clip of the standard mouse. The orientation maintaining member 36 comprises a sphere 42 and a counterweight 44 which depends from the sphere via a shaft 46. The surface of the sphere is supported by three bearings 48 which may, for example, comprise ball-type antifriction bearings rotatably carried on shafts (not shown) and mounted on a web 50 extending horizontally across the fixture 38. The bearings support the orientation maintaining member so that the surface of the sphere 42 engages the ball 30.

It can be seen that, relative to the housing, the center of rotation of the orientation maintaining member is a point coincident with the center of the sphere 42. With the sphere 42 of substantially uniform internal construction, the center of gravity of the orientation maintaining member is offset from the center rotation due to the effect of the counterweight 44 and, as viewed in FIG. 1, is located below the center of rotation.

Figure 1B:
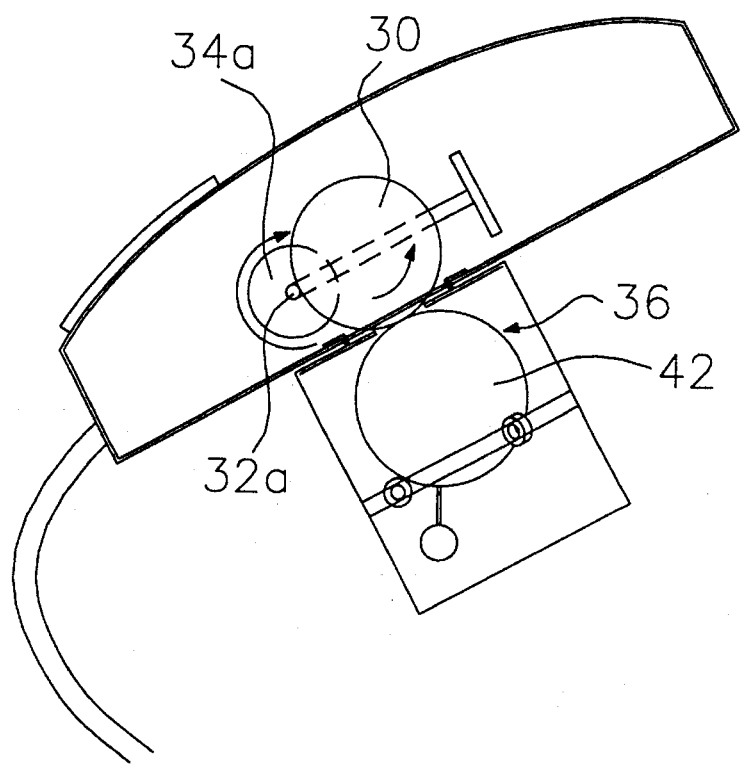

As the device is rotated, for example to the orientation shown in FIG. 1b, the orientation maintaining member 36 will maintain its orientation, thus creating a relative rotation of the housing and the member. Friction between the surface of the sphere 42 and ball 30 maintains them in rolling contact so that a given rotation of the orientation maintaining member (and thus the sphere 42) relative to the housing produces an opposite rotation of the ball relative to the housing. The ball rotates the encoder shafts and thus provides information to the computer indicative of the orientation of the device. This information may be used by the computer 28 to control the position of a cursor 52 on a display 54 (FIG. 8). For example, the vertical and horizontal positions of the cursor on the display may be made to correspond to pitch and roll motions of the device, as detected by the first and second encoders, respectively. The information may, alternatively be used for other purposes such as controlling the orientation of a frame of reference for material shown on the display, such as might be used in a video game in place of joystick input.

Figure 2A:
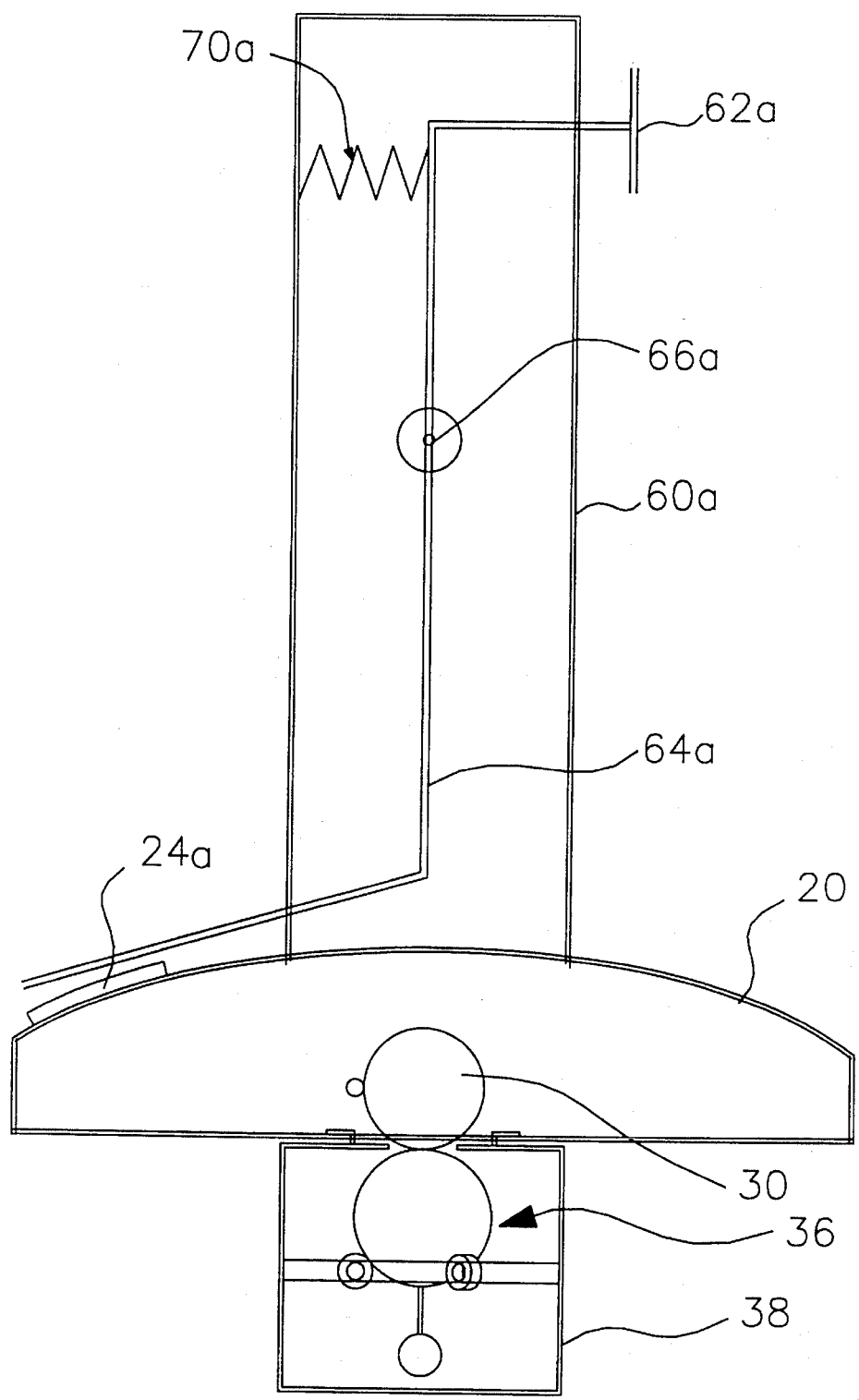
FIGS. 2a–c are semi-schematic side cutaway views of cursor control devices according to principles of the present invention in embodiments featuring trigger mechanisms for actuating switches on the device housing.
Figure 2B:
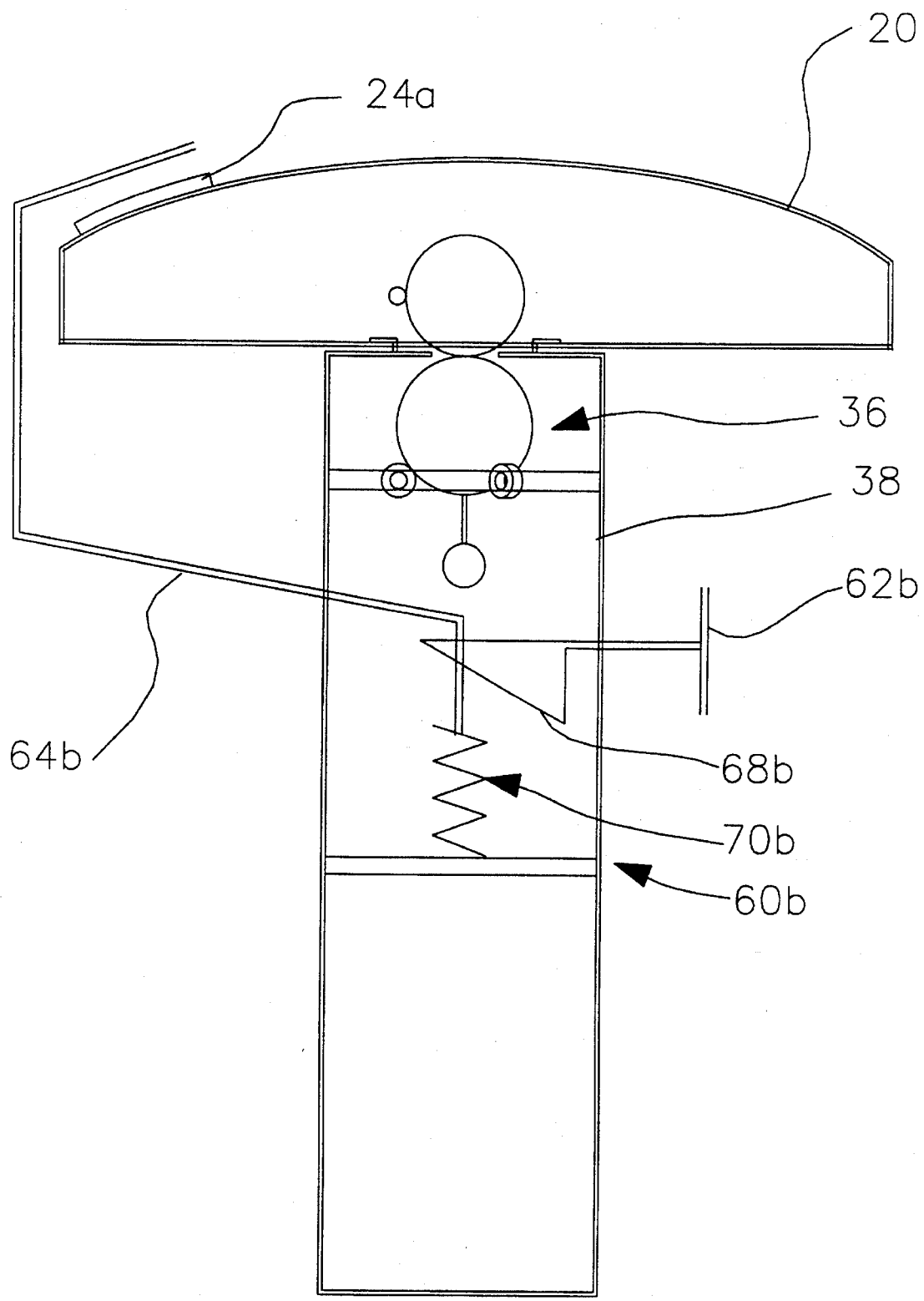
Figure 2C:
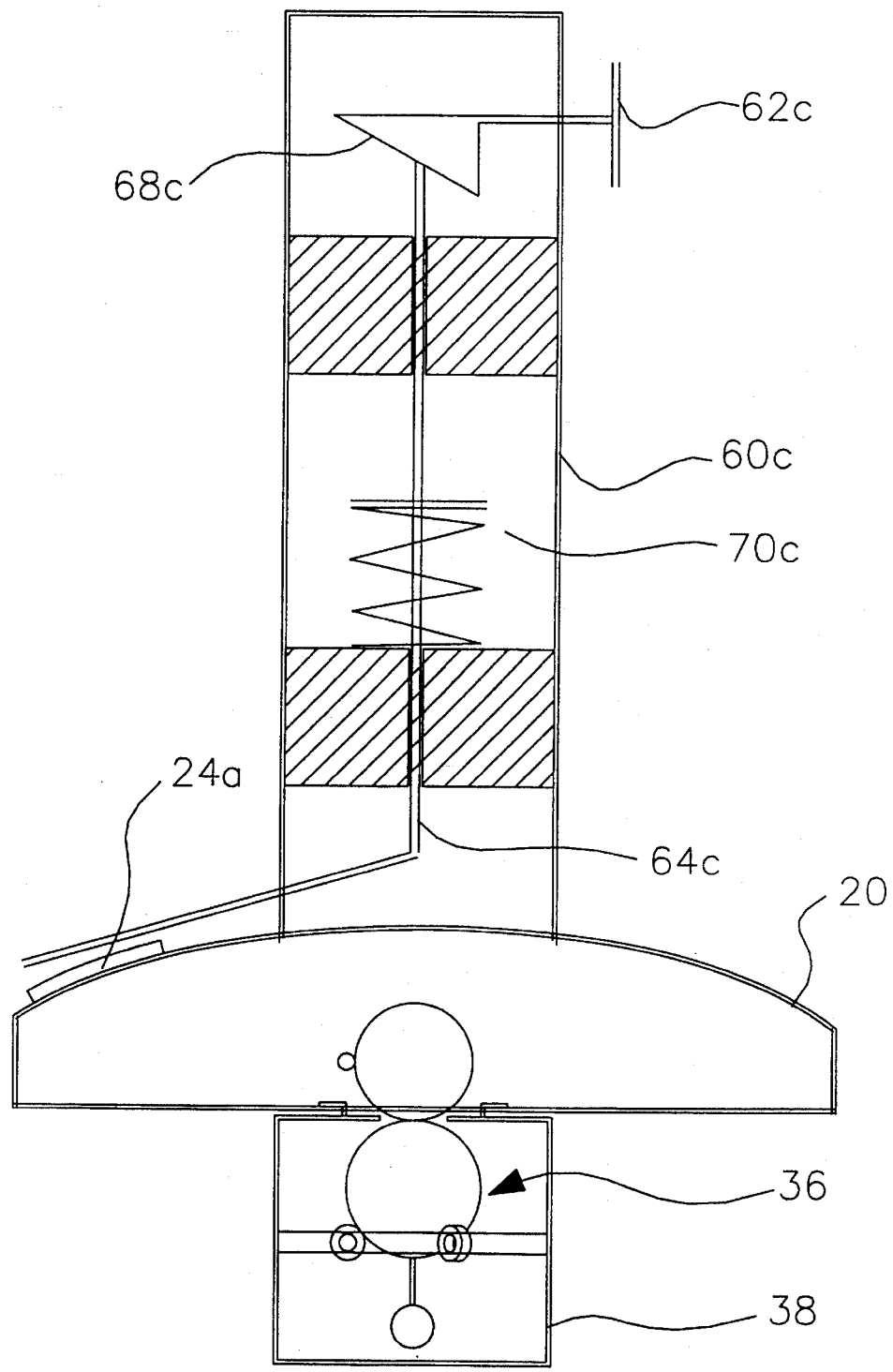

As shown in FIGS. 2a–c, wherein analogous elements of three embodiments are marked with a reference numeral including the letters a–c, respectively, the device may also be provided with a handle 60. In the embodiments of FIGS. 2a & 2c, the handle extends upwardly from the upper housing portion 20. The handle may be affixed to the housing by any appropriate means, such as by an adhesive or by fusing or may be unitarily formed therewith. The embodiment of FIG. 2b features a handle formed as an extension of the fixture 38. In these embodiments, a trigger 62, may be provided in the handle and may be mechanically coupled to one of the buttons (the button used for "clicking" or selecting an on-screen item, typically the left button 241, for a mouse configured for a right-handed user) by a linkage 64. For example, the trigger 62a is firmly attached to the linkage so that depression of the trigger rotates the linkage about a pivot 66 for depressing the button. Alternatively, the triggers 62b & 62c are each provided with an inclined or camming surface 68 which interacts with the linkage 64 to produce a translation of the linkage when the trigger is depressed. In these embodiments, a spring 70 may be provided to bias the linkage to resist depression of the trigger.

Figure 3A:
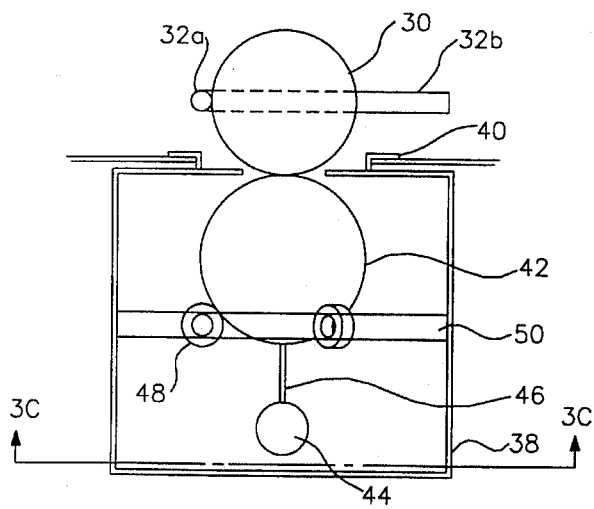
FIGS. 3a & 3b are partial semi-schematic side cutaway views of control devices according to principles of the present invention.
Figure 3B:
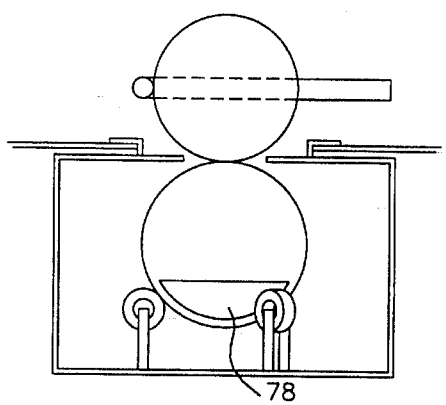
Figure 3C:
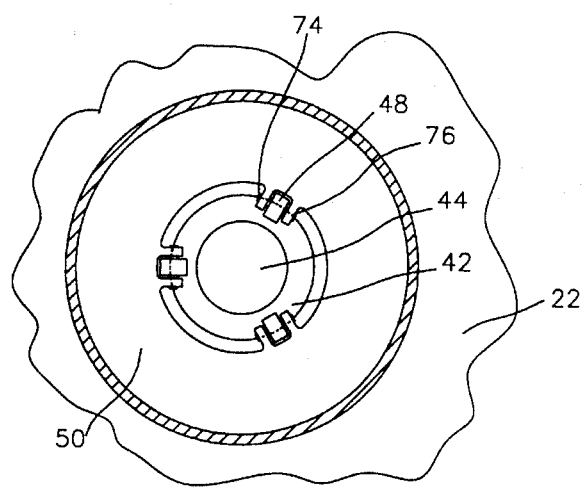

FIGS. 3a & 3c show the fixture of the device of FIG. 1a & 1b with FIG. 3c showing the web 50 of the fixture. As is shown in FIG. 3c, the three bearings 48 are supported on axles 74 held by forks 76 extending inwardly from the web 50.

Figure 4A:
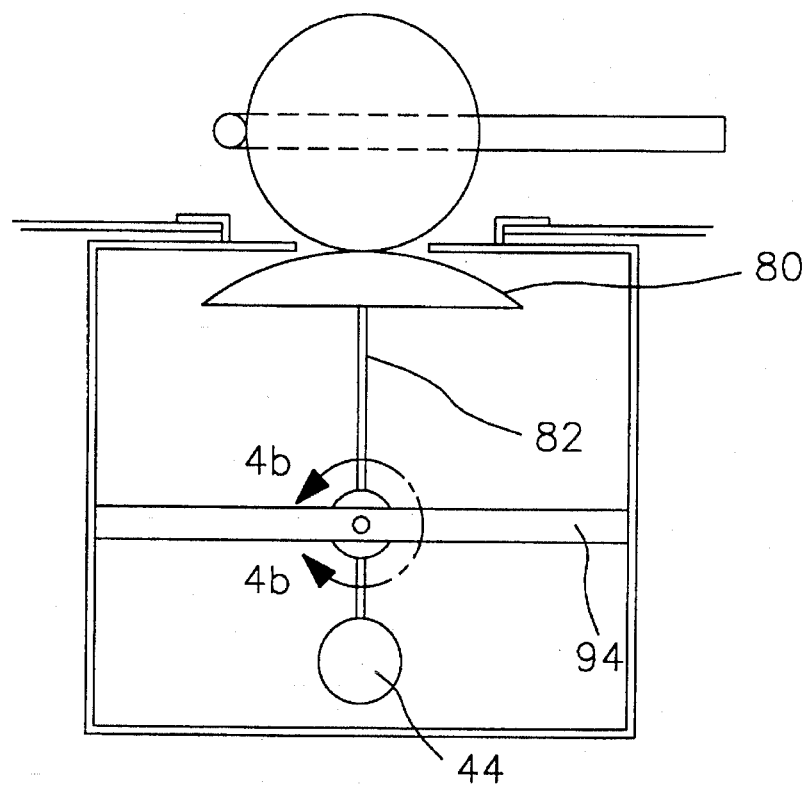
FIG. 4a is a partial semi-schematic side cutaway view of a control device according to principles of the present invention.
Figure 4B:
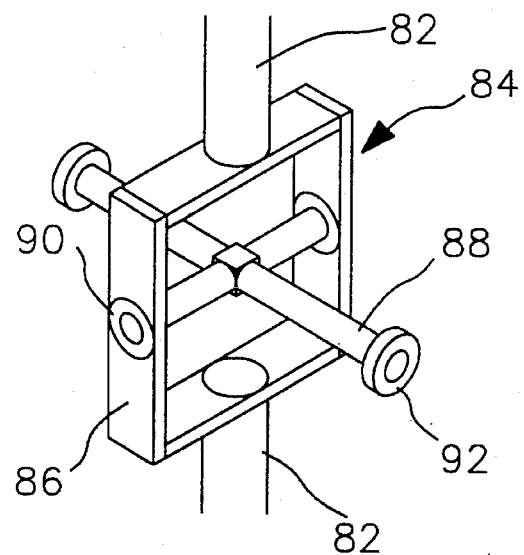

FIG. 3b shows another embodiment wherein the sphere 42 is of nonuniform internal construction, bearing an internal counterweight 78 instead of the external counterweight FIGS. 4a and 4b show an alternate embodiment wherein the orientation maintaining member does not comprise an entire sphere, such as sphere 42 of the embodiment of FIG. 1, but rather a spherical section 80 the spherical surface portion of which engages the mouse ball. The section is supported at the top of an arm 82, the lower end of which carries the counterweight 44. As shown in FIG. 4b, the orientation maintaining member is carried by a gimbal mechanism 84 having a frame 86 and a crossmember 88. The frame connects two sections of the arm 82 and is rotatably engaged to one arm of the crossmember 88 by a pair of bearings 90. The other arm of the crossmember 88 is rotatably engaged by a pair of bearings 92 to a web 94 extending across the fixture. Accordingly, the center of rotation of the orientation maintaining member which is coincident with the center of curvature of the spherical section 80 is located at the center of the crossmember 88 with the center of gravity located therebelow. A variety of pivotal mechanisms could also be used in place of the gimbal mechanism.

FIGS. 5a–d show embodiments of the control device wherein the mouse ball is replaced by the orientation maintaining member, with FIG. 5a showing a member similar to that of FIGS. 1 and 3a and FIG. 5b showing a member similar to that of FIG. 3c. In these embodiments, the retainer clip of the standard mouse and the fixture of the device of FIG. 1 are replaced by a retainer 100 which supports a bearing 102 which engages the surface of the spherical portion of the orientation maintaining member. The bearing 102 and the encoder shafts 32 provide support for the member. The member directly engages the encoder shafts to provide the input information in response to a change in relative orientation of the housing and member.

In a similar vein, FIGS. 6a–d show embodiments of the control device wherein the mouse ball is replaced by a pair of orientation maintaining members each having a single axis of rotation orthogonal to each other. In the embodiment shown in FIGS. 6a & b, each orientation maintaining member comprises a wheel 110 mounted on a shaft 112 with a counterweight 114 depending from the shaft on an arm 116. Each member is supported on a standard 118. The standards extend upward from the central portion of a plug 120 which replaces the retainer clip of the mouse. The circumferential perimeter surfaces of the wheel 110 engage the respective encoder shafts 32. As can be seen each orientation maintaining member has a center of rotation defined by the central axis of its shaft 112. The center of gravity, however, is offset from this axis due to the presence of the counterweight 114.

Figure 6B:
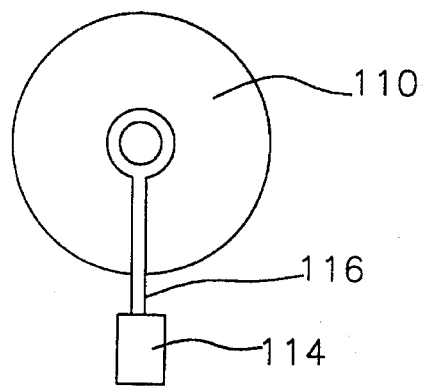
FIGS. 6b–d are semi-schematic side views of orientation maintaining members of control devices according to principles of the present invention.
Figure 6C:
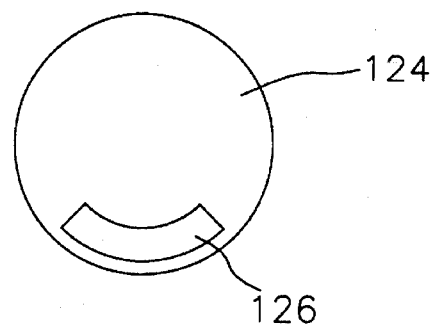

In an alternate embodiment of an orientation maintaining member shown in FIG. 6c, the wheel 124 bears an internal counterweight 126.

Figure 6D:
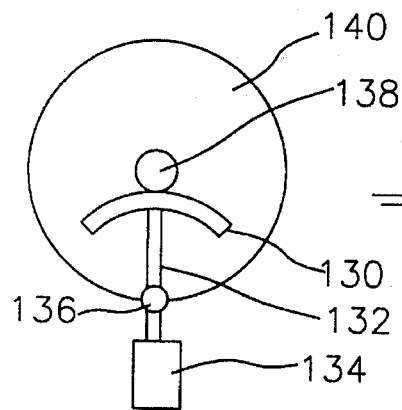

In the embodiment of FIG. 6d, an orientation maintaining member comprises an annular segment 130 formed at one end of an arm 132 with a counterweight 134 at the other end. The orientation maintaining member is free to rotate about the axis of a shaft 136. The circumferential periphery of the annular segment 130 engages a shaft 138 to which a wheel 140 is rigidly connected. The wheel then engages the encoder shaft (not shown) as in the other embodiments. The resulting mechanism may be used to alter the drive ratio between the orientation maintaining member and the encoder for producing a greater rotation of the encoder shaft.

Figure 6E:
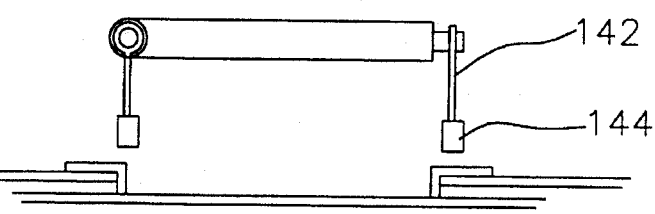
FIG. 6e is a partial semi-schematic side cutaway view of a control device according to principles of the present invention.

In another alternative embodiment shown in FIG. 6e, each orientation maintaining member is formed by an arm 142 which at its upper end connects directly and rigidly to the encoder shaft and at its lower end bears a counterweight 144. Accordingly, the axis of rotation of orientation maintaining member is coincident with the axis of rotation of the encoder shaft.

Figure 7:
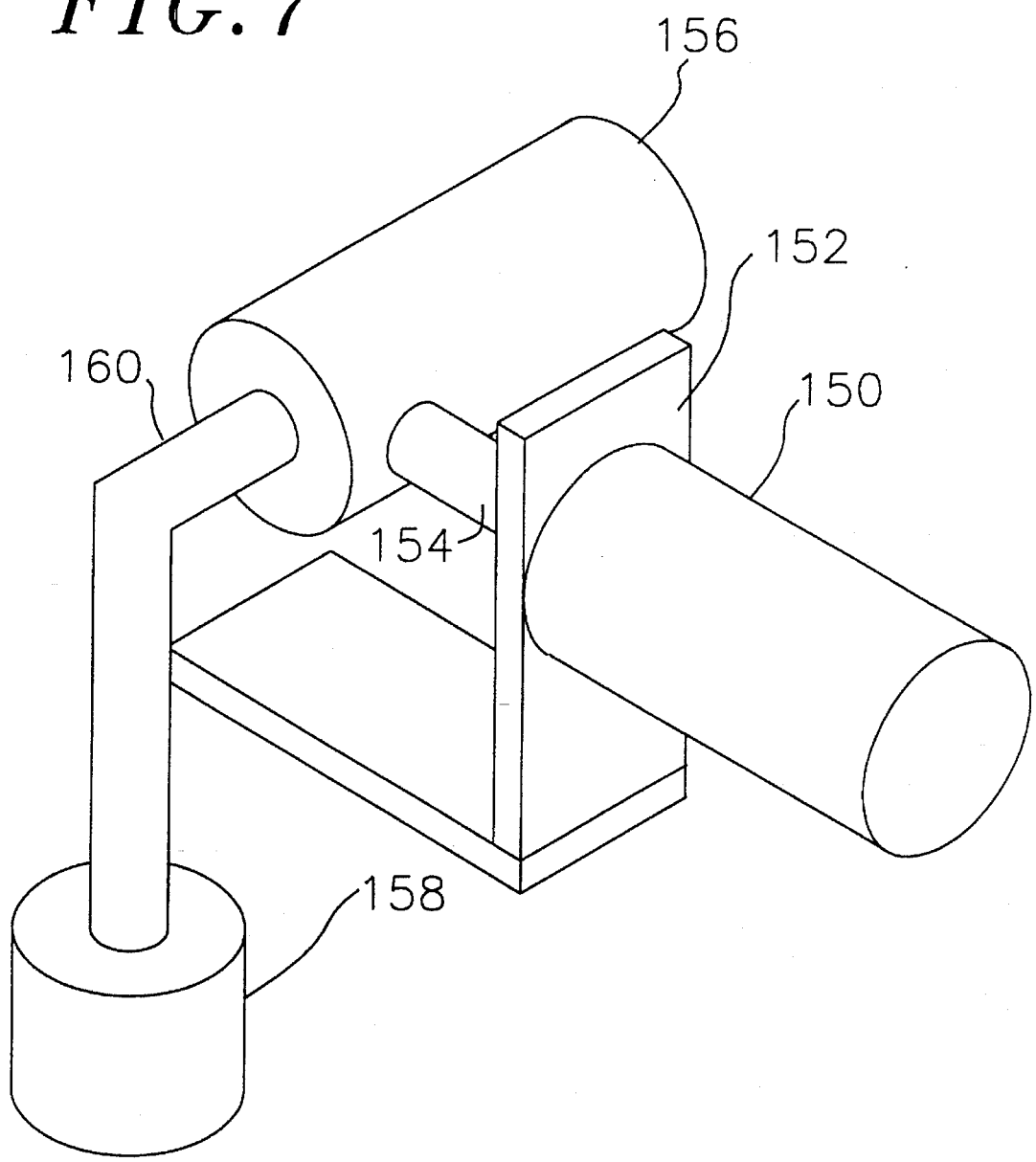
FIG. 7 is a semi-schematic view of an encoder mechanism of a control device according to principles of the present invention.

In FIG. 7, an alternative arrangement of encoders is shown for creating an orientation operated cursor control device. A first encoder 150 is mounted on a bracket 132 which is rigidly connected to the housing. The shaft 154 of the first encoder bears at its distal end a second encoder 156. A counterweight is mounted at the distal end of the shaft 160 of the second encoder. With this arrangement, the counterweight has a center of rotation defined by the axis of the shaft 160 and a center of gravity offset therefrom. Similarly, the combined counterweight and second encoder have a center of rotation coincident with the axis of the shaft 154 and a center of gravity offset therefrom.

Figure 9:
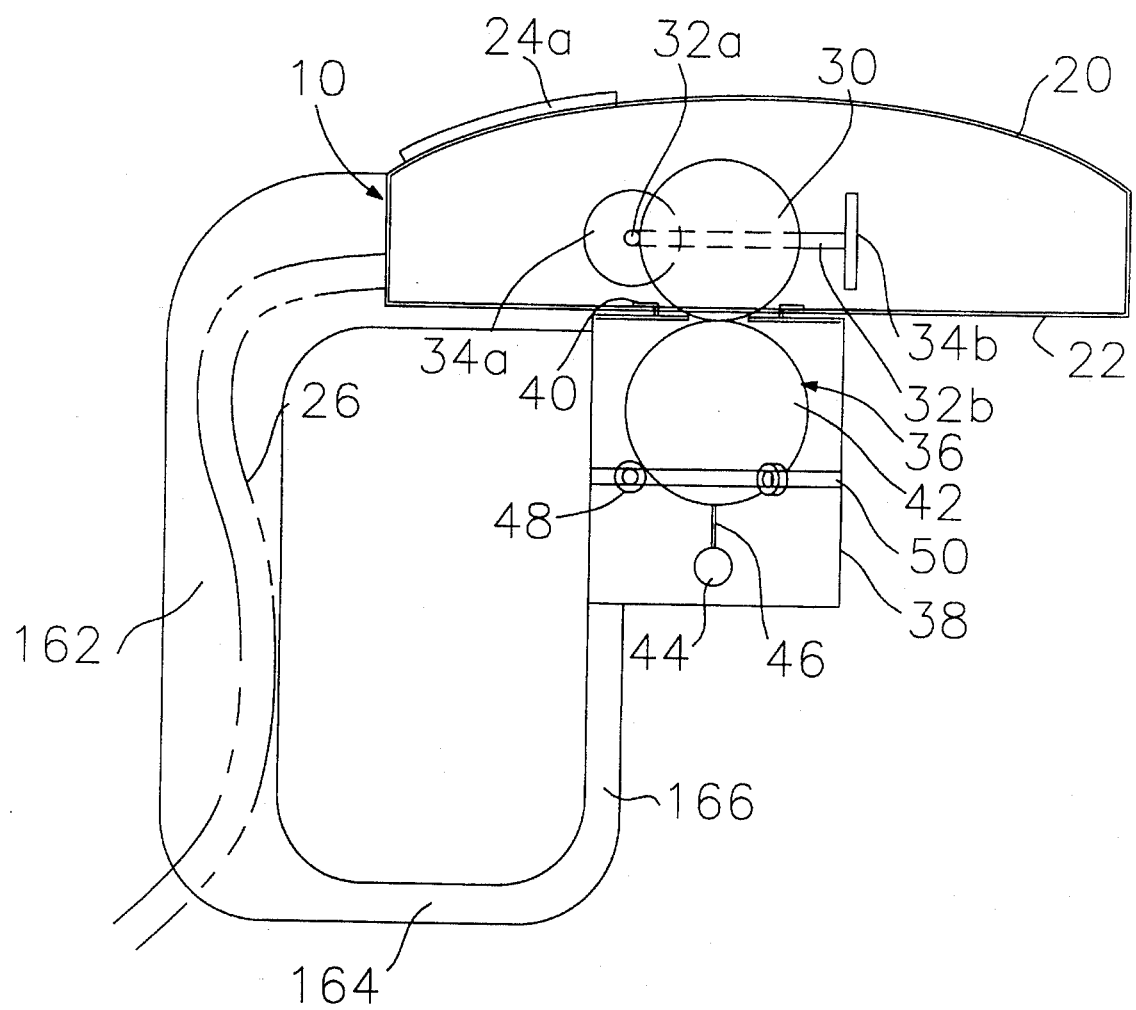
FIG. 9 is a semi-schematic side cutaway view of a cursor control device having a handle which facilitates use of a switch on the device housing.

FIG. 9 shows a modification to the device of FIGS. 1a and 1b wherein forward end 10 now faces rearward and the conventional mouse which is used to form the device is turned around so that it serves as the rear end of the device from which a handle having a grip portion 162 depends. This configuration allows convenient actuation of the switch buttons 24a and 24b with the user's thumb. Additionally, with wiring 26 passing through the grip 162, the chances of entanglement are reduced. The handle also has a base portion 164 extending forward from the bottom of the grip and a front portion 166 extending upwardly from the base portion to join the fixture 38.

Figure 10A:
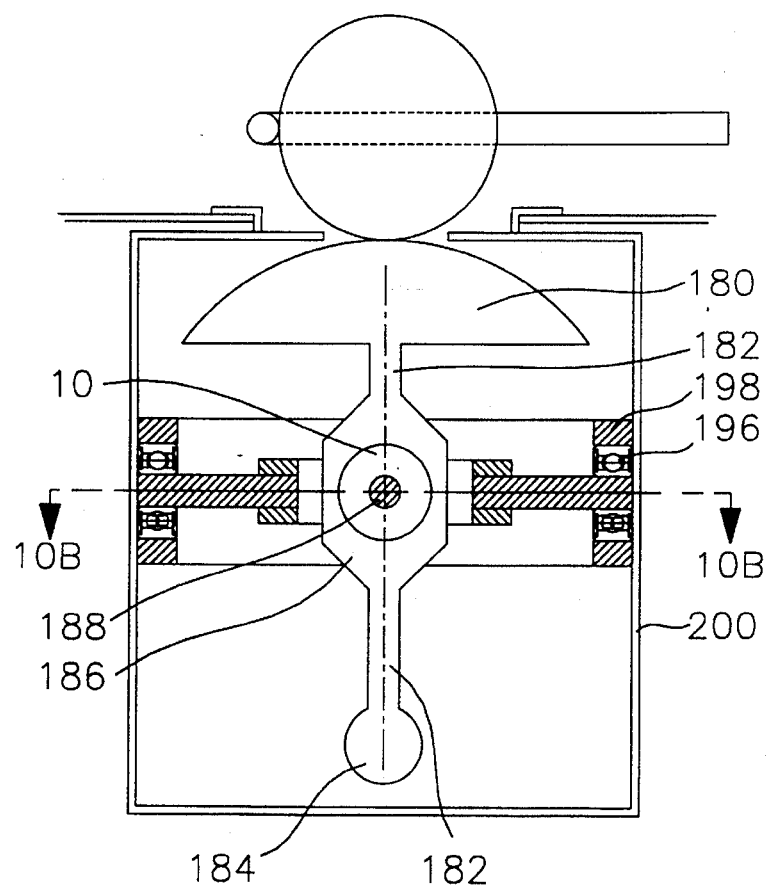
FIG. 10a is a partial semi-schematic side cutaway view of a control device according to principles of the present invention having a gimbal mechanism.
Figure 10B:
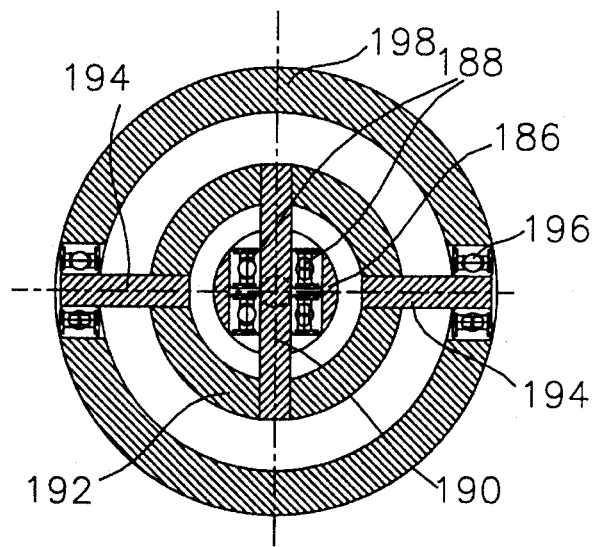

Finally, in FIGS. 10a and 10b an alternate gimbal mechanism is shown. In this embodiment, the spherical section 180 is supported at the top of an arm 182, the lower end of which carries a counterweight 184. The arm is formed with a blister 186 having a hole therethrough, transverse to the length of the arm. As is shown in FIG. 10b, a pair of low friction ball-type bearings are mounted within the hole in the blister 186. A shaft 190 passes through the hole and engages the bearings so that the shaft 190 is rotatable relative to the arm 182. The ends of the shaft 190 are mounted in a ring 192 from which a pair of shaft arms 194 extend radially outward perpendicular to the shaft 190. The far ends of the arms 194 are received by ball-type bearings 196 mounted in an annular feature 198 formed in the interior of the fixture 200 (FIG. 10a).

Although the device may be used with standard mouse driver software, some modifications are advantageous. For example, if the device of FIG. 1a is used with conventional software, and held with the buttons 24a and 24b facing forward (away from the user), tilting the mouse to the left and right, respectively, will produce on-screen motion of the cursor to the left and right. However, a forward rotation, such as is shown in FIG. 1b, produces a somewhat counterintuitive upward movement of the cursor on the display (rather than the more expected downward movement). To correct this, a "switch" may be provided in the driver software to reverse the direction of the on-screen movement associated with the first encoder (which produces the Y motion information in the X—Y coordinate system). If, however, orientation maintaining member(s) which act directly on the encoder shafts are used (such as those of FIGS. 5a & 5b), or if a device is used wherein the front of the original mouse faces rearward in the retrofitted device (such as the devices of FIGS. 2a–c and 9), the situation is reversed. In this case, the on-screen cursor motion down and up corresponds intuitively to forward and backward rotations of the device. However, left and right on-screen motions and device rotations no longer intuitively correspond. Accordingly, a software "switch" may be provided to reverse the X motion provided by the second encoder. Such switches may be controlled by keyboard input.

A preferred method of using the device is in conjunction with a "ballistic" driver which produces cursor movement which is not simply directly proportional to the movement of the mouse (linear movement on a flat surface for a standard mouse or angular movement for an input device of the present invention) but rather proportional both to movement and the velocity associated with the movement. With such a driver, a given movement of the mouse rendered quickly produces a greater on-screen movement of the cursor than if done slowly. With such a driver, every time the device is used, it will come out of "alignment" in that the device may reach a condition where it is oriented vertically but the cursor is not in the center (or other desired location) of the screen. To realign or re-center the system, the user can first quickly change the orientation of the device so that the cursor passes through the center of the screen and slightly beyond. Second, the user can reverse the movement of the device, but at a slower speed, so that when the device returns to its vertical orientation, the cursor is approximately centered on the screen.

Alternatively, a driver may be provided which permits the user to initially center the cursor on the screen by depressing a button on the mouse which centers the cursor and increases the sensitivity of the driver so that a small angular movement of the mouse produces a large on-screen movement of the cursor. The user may then move the cursor to approximately the desired on-screen position, release the button to decrease the sensitivity of the driver and then move the cursor to its exact intended position. Such a driver may be configured so that the right button 24b is used for centering the cursor and controlling the sensitivity of the driver, and the left button 24a remains used for the standard "clicking" function of entering a command or selecting an on-screen item.

While a preferred embodiment of an orientation-operated computer input device has been described and illustrated herein, other constructions will be apparent to those skilled in the art or are otherwise possible. At a minimum, any of a variety of constructions of ball-type computer mice may be used with the present invention. The fitting 40 need not be unitarily formed with the fixture. A plurality of different fittings may be provided, each for use with a different brand or model of mouse. The proper fitting for a user's specific mouse may be selected by the user and attached to the fixture (either permanently or not) to permit the fixture to be used with the mouse.

The perforated disk-type encoders which are traditionally used in computer mice are not a requirement. Additionally, the wired link to the computer provided by wiring 26 may be replaced by any appropriate means for coupling the device to the computer such as an infrared or other wireless link.. Although certain of the illustrated embodiments show the orientation maintaining member supported by ball-type bearings, there are other possible mating portions of the fixture for rotatably supporting the member. It is therefore to be understood that, within the scope of the appended claims, the invention may be practiced otherwise than as specifically described.

What is claimed is:

1. A gravity operated device for delivering input information to a remote computer, comprising:

a hand-held housing;

an gravity operated member rotatably carried by said housing, said gravity operated member having a spherical external surface and a depending counterweight whereby the center of rotation of the member is offset from its center of gravity;

a ball having a spherical surface portion engageable with the spherical external surface of the member;

encoder means operatively engaged with the ball for generating said input information responsive to relative rotation of said housing and said gravity operated member produced by an absolute rotation of said housing in space; and means for coupling the encoder means to the computer to deliver said input information to the computer.

2. The device of claim 1 wherein said gravity operated member has a spherical external surface and a nonuniform internal construction.

3. The device of claim 1 wherein said gravity operated member is carried by a gimbal mechanism of said housing.

4. The device of claim 1 wherein said gravity operated member is supported by an interaction of its spherical surface portion with a mating portion of said housing.

5. The device of claim 1 wherein said gravity operated member includes a counterweight connected to said spherical surface portion.

6. The device of claim 1 wherein the input information provides control for a pointer on a display of said computer.

7. The device of claim 1 wherein the means for coupling comprises a wired link between the device and the remote computer.

8. The device of claim 1 wherein said gravity operated member is located entirely within said housing.

9. The device of claim 8 wherein said gravity operated member is carried within a fixture portion of said housing, said fixture portion is removeably securable to a base portion of said housing.

10. The device of claim 9 wherein said fixture portion forms a handle, which handle further has a trigger which may be depressed to activate a switch.

11. The device of claim 9 further comprising a handle having a grip portion depending from a rear end of the device.

12. The device of claim 11 wherein said means for coupling the encoder means to the computer comprises wiring passing through the grip portion and wherein the handle has a base portion extending forward from a bottom of the grip portion and a front portion extending upwardly from the base portion to join the fixture.

13. A fixture for enhancing the operation of a conventional computer mouse having a rotatable member for producing cursor control information to be transmitted to a computer comprising:

a housing adopted to be attached to the computer mouse;

a gravity operated member rotatably mounted in said housing, said gravity operated member having a center of gravity offset from its center of rotation, the housing being attached to the mouse such that the rotatable member is in surface contact with the gravity operated member whereby side to side rolling movements and pitch and yaw movements of the computer mouse in space produce relative rotation of the gravity operated member and the rotatable member to generate the cursor control information.

14. A device for modifying a ball-type computer mouse for producing computer input information responsive to pitch and roll orientations of the mouse, comprising:

a fixture securable to the mouse; and a gravity operated member rotatably carried by the fixture and having a center of rotation offset from the center of gravity of the member and having a surface portion engageable with the ball of said mouse for producing a rotation of said ball responsive to rotation of the mouse when said device and mouse is held in space and subjected to pitch and roll movement.

15. The device of claim 14 wherein said surface portion is a spherical surface portion engageable with a spherical external surface of the ball.

16. The device of claim 15 wherein said gravity operated member is carried by a gimbal mechanism of said fixture.

17. The device of claim 15 wherein said gravity operated member is supported by an interaction of its spherical surface portion with a mating portion of said fixture.

18. The device of claim 15 wherein said gravity operated member bears a counterweight external to said spherical surface portion.

* * * * *